(12) United States Patent
Skov et al.

(10) Patent No.: US 9,603,126 B2
(45) Date of Patent: Mar. 21, 2017

(54) COMMON CONTROL DEACTIVATION IN CARRIER AGGREGATION

(75) Inventors: Peter Skov, Beijing (CN); Jie Zhen Lin, Beijing (CN); Chun Hai Yao, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 137 days.

(21) Appl. No.: 13/994,189

(22) PCT Filed: Dec. 16, 2010

(86) PCT No.: PCT/CN2010/002051
§ 371 (c)(1),
(2), (4) Date: Jun. 14, 2013

(87) PCT Pub. No.: WO2012/079197
PCT Pub. Date: Jun. 21, 2012

(65) Prior Publication Data
US 2013/0258995 A1 Oct. 3, 2013

(51) Int. Cl.
*H04W 72/04* (2009.01)
*H04L 5/00* (2006.01)
(Continued)

(52) U.S. Cl.
CPC ....... *H04W 72/0406* (2013.01); *H04L 5/0037* (2013.01); *H04L 5/0053* (2013.01); *H04W 72/00* (2013.01); *H04W 72/02* (2013.01)

(58) Field of Classification Search
CPC ... H04L 5/001; H04L 5/0098; H04W 72/0453
(Continued)

(56) References Cited

U.S. PATENT DOCUMENTS

| 2010/0130219 A1* | 5/2010 | Cave ..................... H04W 72/02 455/450 |
| 2011/0039593 A1* | 2/2011 | Lee ......................... H04L 1/188 455/515 |

(Continued)

OTHER PUBLICATIONS

TR 36.922 V1.3.0 section 6.4.2.1"Synchronization using Network Listening," 3GPP Technical Specification Group Radio Access Networks; Evolved Universal Terrestrial Radio Access (E-UTRA); LTE TDD Home eNodeB RF Requirements (Release 9) (74 pages).

*Primary Examiner* — Wei Zhao
*Assistant Examiner* — Sai Aung
(74) *Attorney, Agent, or Firm* — Harrington & Smith

(57) ABSTRACT

There are provided measures for common control deactivation in carrier aggregation, said measures exemplarily including a configuration of a secondary carrier for carrier aggregation with a primary carrier of a terminal, including a deactivation of a common control for the secondary carrier, an indication of the deactivation of the common control for the secondary carrier via the primary carrier, and a signaling of control information, substituting control information of the deactivated common control, for facilitating selection of or operation on the secondary carrier without the deactivated common control via the primary carrier from a base station to the terminal. Said measures may exemplarily be applied for common control deactivation in carrier aggregation in heterogeneous network environments based on LTE, LTE-Advanced, HSPA and/or UMTS radio access systems.

18 Claims, 4 Drawing Sheets

(51) Int. Cl.
  *H04W 72/00* (2009.01)
  *H04W 72/02* (2009.01)

(58) Field of Classification Search
  USPC .......................... 370/252, 329; 455/450, 515
  See application file for complete search history.

(56) References Cited

U.S. PATENT DOCUMENTS

| | | | | |
|---|---|---|---|---|
| 2011/0268071 | A1* | 11/2011 | Siew | H04L 1/0003 370/329 |
| 2012/0057490 | A1* | 3/2012 | Park | H04L 5/001 370/252 |
| 2012/0099464 | A1* | 4/2012 | Chun | H04L 5/00 370/252 |
| 2012/0230265 | A1* | 9/2012 | Lee | H04L 5/003 370/329 |
| 2013/0010619 | A1* | 1/2013 | Fong | H04W 74/002 370/252 |
| 2013/0301444 | A1* | 11/2013 | Sachs | H04L 5/001 370/252 |

* cited by examiner

COMMON CONTROL DEACTIVATION IN CARRIER AGGREGATION

FIELD

The present invention relates to common control deactivation in carrier aggregation. For example, the present invention relates to common control deactivation in carrier aggregation in heterogeneous network environments.

BACKGROUND

In the development of radio communication systems, in particular cellular communication (like for example GSM (Global System for Mobile Communication), GPRS (General Packet Radio Service), HSPA (High Speed Packet Access), UMTS (Universal Mobile Telecommunication System) or the like), efforts are made for an evolution of the radio access part thereof. In this regard, the evolution of radio access networks (like for example the GSM EDGE radio access network (GERAN) and the Universal Terrestrial Radio Access Network (UTRAN) or the like) is currently addressed. Such improved radio access networks are sometimes denoted as evolved or advanced radio access networks (like for example the Evolved Universal Terrestrial Radio Access Network (E-UTRAN)) or as being part of a long-term evolution (LTE) or LTE-Advanced, also generally referred to as International Mobile Communications—Advanced (IMT-A). Although such denominations primarily stem from 3GPP (Third Generation Partnership Project) terminology, the usage thereof hereinafter does not limit the respective description to 3GPP technology, but generally refers to any kind of radio access evolution irrespective of the underlying system architecture.

In the following, for the sake of intelligibility, LTE (Long-Term Evolution according to 3GPP terminology) or, specifically, LTE-Advanced is taken as a non-limiting example for a radio access network of cellular type being applicable in the context of the present invention and its embodiments. However, it is to be noted that any kind of radio access network of cellular type, such as GSM, GPRS, HSPA and/or UMTS, may likewise be applicable, as long as it exhibits comparable features and characteristics as described hereinafter.

In the development of cellular systems in general, and access networks in particular, heterogeneous network environments, also referred to as multi-layer cellular network systems, comprising a combination of macrocells and microcells (also referred to as relaycells, picocells or femtocells) are proposed as one concept. Thereby, the macrocells (having high transmit power) typically provide for a large geographical coverage, while the microcells (having low transmit power) typically provide for additional capacity of low geographical coverage in areas with a high user deployment. In the context of LTE or LTE-Advanced, the macrocells are typically deployed by base stations denoted as eNBs, while microcells are typically deployed by home base stations denoted as HeNBs. Such heterogeneous network environment may, thus, be considered to be composed at least of two network layers, i.e. a microcell layer and an overlay macrocell layer.

The two network layers of a heterogeneous network environment, i.e. the base stations and/or cells of the two network layers, may be implemented by the same or different radio access technologies. For example, a heterogeneous network environment may be composed of a GSM-based macrocell layer and a LTE-based microcell layer.

FIG. 1 shows a schematic diagram of a deployment scenario of a heterogeneous network environment comprising a combination of macrocells and microcells. In FIG. 1, macrocells are illustrated by hexagonal blocks, while microcells are illustrated by rectangular blocks. In the dashed circle, an enlarged view of a microcell including a microcell base station and a user equipment is illustrated.

In the development of cellular systems in general, and access networks in particular, e.g. in the framework of heterogeneous network environments, carrier aggregation is proposed as one concept. Thereby, both a primary carrier and one or more secondary (non-primary) carriers are used simultaneously by a terminal, wherein the control is derived from the primary carrier.

In this regard, a primary carrier is a standalone carrier which is configured to convey all control information required to operate the system (typically to allow network entry and preliminary exchange to establish a session). Typical information needed to be transmitted over the primary carrier includes broadcast channel, random access channel, map information, etc. A secondary (non-primary) carrier is an additional carrier that could be assigned by the system (i.e. the base station) to a terminal to increase its data rate. Therefore, primary carriers must be fully configured, and a secondary (non-primary) carrier could be either fully configured or partially configured, depending on the deployment scenario. For instance, a fully configured carrier could act as a primary carrier for a specific terminal while being used as a secondary (non-primary) carrier for another terminal.

In the following, carrier aggregation is assumed as the mode of carrier deployment of radio access networks of cellular type being applicable in the context of the present invention and its embodiments.

In certain cases, secondary (non-primary) carriers might for example be deployed in areas with high and unpredictable interference. In such cases, the reliability of control channels and/or signals (of secondary carriers) could be endangered and lead to poor system performance.

The problem of high and unpredictable interference has already received a lot of attention in standardization. In the context of carrier aggregation, it has been agreed to support cross carrier scheduling which allows that certain control channels can be transmitted on one carrier while allocating data transmission on another carrier. The feature of cross carrier scheduling is capable of solving problems regarding the control channel reliability for control channels such as PDCCH (Physical Downlink Control Channel), PCFICH (Physical Control Format Indicator Channel), PHICH (Physical Hybrid-ARQ Indicator Channel; ARG: Automatic Repeat Request), and PUCCH (Physical Uplink Control Channel).

However, a problem with the feature of cross carrier scheduling is that common physical control channels and/or signals, such as PBCH (Physical Broadcast Channel), SSS (Secondary Synchronization Signal) and PSS (Primary Synchronization Signal), may not benefit and, thus, are still subject to the high and unpredictable interference.

In this regard, the key issue is that the transmission of the aforementioned common physical control channels and/or signals may not rely on conventional ICIC (Inter-Cell Interference Coordination) methods, but they need to be transmitted on specific, well-defined, resources. Further, the aforementioned common physical control channels and/or signals may not be muted or in other ways orthogonally allocated between neighboring cells.

The aforementioned common physical control channels and/or signals may be used by terminals for the purposes of synchronization, cell search/detection, radio resource management (RRM) related measurements and/or data channel demodulation. Accordingly, the fact that the interference situation for the aforementioned common physical control channels and/or signals may not be improved by conventional interference avoidance techniques may lead to problems in synchronization, cell search/detection, radio resource management (RRM) related measurements and/or data channel demodulation, particularly at the terminal side.

If the transmission of the aforementioned common physical control channels and/or signals is heavily interfered, then the terminals relying on these channels and/or signals may not be able to access the respective carrier (e.g. the respective secondary carrier). In this regard, it is to be noted that terminals may for example try to validate synchronization by a successful decoding of the PBCH.

In the same stage/context, a terminal may also try to obtain a cell (physical) ID from a decoding of the SSS, and may also try to obtain MIB (Master Information Block) information from the PBCH, including downlink system bandwidth, PHICH configuration, system frame number, etc. With successful decoding of the PBCH, a terminal may also obtain antenna ports configuration of a base station (such as a eNB) which is masked with CRC (Cyclic Redundancy Check) according to the number of transmit antennas ports at the base station (such as the eNB).

All of the above-mentioned operations, i.e. operations in the context of synchronization, cell search/detection, radio resource management (RRM) related measurements and/or data channel demodulation, suffer from interference of the aforementioned common physical control channels and/or signals (especially, but not exclusively, in the framework of carrier aggregation when selecting a non-primary carrier, i.e. when trying to camp on a non-primary cell).

In this regard, it could be conceivable that, as has been already discussed in standardization, the system information of a secondary (non-primary) carrier may be transmitted via RRC (Radio Resource Control) configuration signaling when adding the secondary (non-primary) cell/carrier to the primary cell/carrier in carrier aggregation. However, such an approach has the drawback that it is based on a RRC (Radio Resource Control) signaling rather than a PHY/MAC (Physical layer/Medium Access Control) signaling. Further, such an approach has the drawback that it is not applicable for certain ones of the aforementioned common physical control channels and/or signals (such as e.g. the PSS and the SSS), and thus the terminal synchronization with a secondary (non-primary) carrier is not able to be applied. Still further, such an approach has the drawback that it does not relate to the transmission/provision of the cell (physical) ID information as well as the antenna ports configuration of the base station to the terminal. Accordingly, such an approach is not capable of solving the entirety of the above-mentioned problems and, thus, may not provide for a comprehensive and/or overall solution in view of the above-outlined situation.

In view of the above, there are several problems in terms of high and unpredictable interference particularly of secondary (non-primary carriers) in the framework of carrier aggregation, which may not be solved by conventional techniques.

Accordingly, there is a demand for mechanisms for improving carrier aggregation, particularly regarding the selection of a secondary (non-primary) carrier in the framework of carrier aggregation.

SUMMARY

Embodiments of the present invention aim at addressing at least part of the above issues and/or problems.

The present invention and its embodiments are made to provide for mechanisms for improving carrier aggregation, particularly regarding the selection of a secondary (non-primary) carrier in the framework of carrier aggregation.

According to an exemplary first aspect of the present invention, there is provided a method comprising configuring a secondary carrier for carrier aggregation with a primary carrier of a terminal, including deactivating a common control for the secondary carrier, transmitting an indication of the deactivation of the common control for the secondary carrier via the primary carrier to the terminal, and transmitting a signaling of control information, substituting control information of the deactivated common control, for facilitating selection of or operation on the secondary carrier without the deactivated common control via the primary carrier to the terminal.

According to further developments or modifications thereof, one or more of the following applies:
  the control information comprises information for accessing and/or monitoring a common reference signal of the secondary carrier,
  the control information comprises information for synchronization with the secondary carrier, radio resource management related measurements on the secondary carrier, demodulation of a shared data channel of the secondary carrier, and/or radio link failure recovery of the secondary carrier,
  the deactivation of the common control comprises deactivating at least one of a physical broadcast channel, a primary signaling signal and a secondary signaling signal, wherein the deactivated physical broadcast channel, primary signaling signal and/or secondary signaling signal is continued to be transmitted or disabled to be transmitted,
  the indication of the deactivation comprises an indication on secondary carrier selection and/or re-selection procedure when a secondary carrier is already selected, and/or an indication on secondary carrier measurement configuration when a secondary carrier is not selected, and/or an indication on secondary carrier configuration and/or reconfiguration when after measurement the secondary carrier is selected with determination of common control un-usability,
  the indication of the deactivation comprises a terminal-specific deactivation being applicable for the said terminal, the indication of which is transmitted by an implicit coding or by an explicit indicator, or a cell-specific deactivation being applicable for some or all terminals using the primary carrier, the indication of which is transmitted on a broadcast channel of the primary carrier,
  the method further comprises at least one of receiving a report on loss/unability of synchronization with the secondary carrier and/or a radio link failure on the secondary carrier from the terminal, and effecting the configuration and/or the signaling for the secondary carrier based thereon, and receiving a report on measurements regarding the selection of or the operation on the secondary carrier from the terminal, and activating the secondary carrier based thereon,
  the method is operable at or by a base station, eNB, and/or a home base station, HeNB, in accordance with an LTE or LTE-Advanced radio access system, and/or the method is operable in a heterogeneous network environment with a macro network layer comprising macro cells and a relay/micro/pico/femto network layer comprising relay/micro/pico/femto cells.

According to an exemplary second aspect of the present invention, there is provided a method comprising receiving an indication of a deactivation of a common control for a secondary carrier via a primary carrier from a base station being in charge of configuring the secondary carrier for carrier aggregation with the primary carrier, receiving a signaling of control information, substituting control information of the deactivated common control, for facilitating selection of or operation on the secondary carrier without the deactivated common control via the primary carrier from the base station, and selecting or operating on the secondary carrier based on the received control information.

According to further developments or modifications thereof, one or more of the following applies:

the control information comprises information for accessing and/or monitoring a common reference signal of the secondary carrier, and the selecting or operating on comprises accessing and/or monitoring the common reference signal of the secondary carrier, the control information comprises information for synchronization with the secondary carrier, radio resource management related measurements on the secondary carrier, demodulation of a shared data channel of the secondary carrier, and/or radio link failure recovery of the secondary carrier, the selecting or operating on comprises synchronizing with the secondary carrier by aligning with the primary carrier synchronization and/or performing measurements relating to radio resource management of the secondary carrier, demodulating the shared data channel of the secondary carrier and/or performing radio link failure recovery of the secondary carrier, the deactivation of the common control comprises
  a deactivation of at least one of a physical broadcast channel, a primary signaling signal and a secondary signaling signal, wherein the deactivated physical broadcast channel, primary signaling signal and/or secondary signaling signal is received and ignored or not received, the indication of the deactivation comprises an indication on secondary carrier selection and/or re-selection procedure when a secondary carrier is already selected, and/or an indication on secondary carrier measurement configuration when a secondary carrier is not selected, and/or an indication on secondary carrier configuration and/or reconfiguration when after measurement the secondary carrier is selected with determination of common control un-usability, the indication of the deactivation comprises a terminal-specific deactivation, the indication of which is received by an implicit coding or by an explicit indicator, or a cell-specific deactivation, the indication of which is received on a broadcast channel of the primary carrier, the method further comprises at least one of transmitting a report on loss/unability of synchronization with the secondary carrier and/or a radio link failure on the secondary carrier to the base station, and transmitting a report on measurements regarding the selection of or operation on the secondary carrier to the base station, the method is operable at or by a terminal, UE, in accordance with an LTE or LTE-Advanced radio access system, and/or the method is operable in a heterogeneous network environment with a macro network layer comprising macro cells and a relay/micro/pico/femto network layer comprising relay/micro/pico/femto cells.

According to an exemplary third aspect of the present invention, there is provided an apparatus comprising a processor configured to configure a secondary carrier for carrier aggregation with a primary carrier of a terminal, including deactivating a common control for the secondary carrier, and a transmitter configured to transmit an indication of the deactivation of the common control for the secondary carrier via the primary carrier to the terminal, and transmit a signaling of control information, substituting control information of the deactivated common control, for facilitating selection of or operation on the secondary carrier without the deactivated common control via the primary carrier to the terminal.

According to further developments or modifications thereof, one or more of the following applies:

the control information comprises information for accessing and/or monitoring a common reference signal of the secondary carrier, the control information comprises information for synchronization with the secondary carrier, radio resource management related measurements on the secondary carrier, radio link failure recovery of the secondary carrier, and/or demodulation of a shared data channel of the secondary carrier, the processor, for deactivation of the common control, is configured to deactivate at least one of a physical broadcast channel, a primary signaling signal and a secondary signaling signal, and instruct the transmitter to continue or disable transmitting the deactivated physical broadcast channel, primary signaling signal and/or secondary signaling signal, the indication of the deactivation comprises an indication on secondary carrier selection and/or re-selection procedure when a secondary carrier is already selected, and/or an indication on secondary carrier measurement configuration when a secondary carrier is not selected, and/or an indication on secondary carrier configuration and/or reconfiguration when after measurement the secondary carrier is selected with determination of common control un-usability, the indication of the deactivation comprises a terminal-specific deactivation being applicable for the said terminal, and the processor is configured to instruct the transmitter to transmit the indication thereof by an implicit coding or by an explicit indicator, or a cell-specific deactivation being applicable for some or all terminals using the primary carrier, and the processor is configured to instruct the transmitter to transmit the indication thereof on a broadcast channel of the primary carrier, the apparatus comprises a receiver configured to receive a report on loss/unability of synchronization with the secondary carrier and/or a radio link failure on the secondary carrier from the terminal, and the processor and/or transmitter is configured to effect the configuration and/or the signaling for the secondary carrier based thereon, and the apparatus comprises a receiver configured to receive a report on measurements regarding the selection of or operation on the secondary carrier from the terminal, and the processor is configured to activate the secondary carrier based thereon, the apparatus is operable as or at a base station, eNB, and/or a home base station, HeNB, in accordance with an LTE or LTE-Advanced radio access system, and/or the apparatus is operable in a heterogeneous network environment with a macro network layer comprising macro cells and a relay/micro/pico/femto network layer comprising relay/micro/pico/femto cells.

According to an exemplary fourth aspect of the present invention, there is provided an apparatus comprising a receiver configured to receive an indication of a deactivation of a common control for a secondary carrier via a primary carrier from a base station being in charge of configuring the secondary carrier for carrier aggregation with the primary carrier, and receive a signaling of control information, substituting control information of the deactivated common control, for facilitating selection of or operation on the secondary carrier without the deactivated common control via the primary carrier from the base station, and a processor configured to select or operate on the secondary carrier based on the received control information.

According to further developments or modifications thereof, one or more of the following applies:

the control information comprises information for accessing and/or monitoring a common reference signal of the secondary carrier, and the processor, for selecting or operating, is configured to access and/or monitor the common reference signal of the secondary carrier, the control information comprises information for synchronization with the secondary carrier, radio resource management related measurements on the secondary carrier, demodulation of a shared data channel of the secondary carrier and/or radio link failure recovery of the secondary carrier, and the processor, for selecting or operating, is configured to synchronize with the secondary carrier by aligning with the primary carrier synchronization and/or perform measurements relating to radio resource management of the secondary carrier, demodulate the shared data channel of the secondary carrier, and/or perform radio link failure recovery of the secondary carrier, the deactivation of the common control comprises a deactivation of at least one of a physical broadcast channel, a primary signaling signal and a secondary signaling signal, wherein the receiver is configured to receive and the processor is configured to ignore or the receiver is configured to not receive the deactivated physical broadcast channel, primary signaling signal and/or secondary signaling signal, the indication of the deactivation comprises an indication on secondary carrier selection and/or re-selection procedure when a secondary carrier is already selected, and/or an indication on secondary carrier measurement configuration when a secondary carrier is not selected, and/or an indication on secondary carrier configuration and/or reconfiguration when after measurement the secondary carrier is selected with determination of common control un-usability, the indication of the deactivation comprises a terminal-specific deactivation, and the receiver is configured to receive the indication thereof which by an implicit coding or by an explicit indicator, or a cell-specific deactivation, and the receiver is configured to receive the indication thereof on a broadcast channel of the primary carrier, the processor is configured to prepare and the transmitter is configured to transmit a report on loss/unability of synchronization with the secondary carrier and/or a radio link failure on the secondary carrier to the base station, and the processor is configured to prepare and the transmitter is configured to transmit a report on measurements regarding the selection of or operation on the secondary carrier to the base station, the apparatus is operable as or at a terminal, UE, in accordance with an LTE or LTE-Advanced radio access system, and/or the apparatus is operable in a heterogeneous network environment with a macro network layer comprising macro cells and a relay/micro/pico/femto network layer comprising relay/micro/pico/femto cells.

According to an exemplary fifth aspect of the present invention, there is provided a computer program or computer program product including a program comprising software code portions being arranged, when run on a processor of an apparatus, to perform a method comprising configuring a secondary carrier for carrier aggregation with a primary carrier of a terminal, including deactivating a common control for the secondary carrier, transmitting an indication of the deactivation of the common control for the secondary carrier via the primary carrier to the terminal, and transmitting a signaling of control information, substituting control information of the deactivated common control, for facilitating selection of or operation on the secondary carrier without the deactivated common control via the primary carrier to the terminal.

Generally, according to the exemplary fifth aspect of the present invention, there is provided a computer program or computer program product including a program comprising software code portions being arranged, when run on a processor of an apparatus (such as e.g. according to the above third aspect and/or developments or modifications thereof), to perform the method according to the above first aspect and/or developments or modifications thereof).

According to an exemplary sixth aspect of the present invention, there is provided a computer program or computer program product including a program comprising software code portions being arranged, when run on a processor of an apparatus, to perform a method comprising receiving an indication of a deactivation of a common control for a secondary carrier via a primary carrier from a base station being in charge of configuring the secondary carrier for carrier aggregation with the primary carrier, receiving a signaling of control information, substituting control information of the deactivated common control, for facilitating selection of or operation on the secondary carrier without the deactivated common control via the primary carrier from the base station, and selecting or operating on the secondary carrier based on the received control information.

Generally, according to the exemplary sixth aspect of the present invention, there is provided a computer program or computer program product including a program comprising software code portions being arranged, when run on a processor of an apparatus (such as e.g. according to the above fourth aspect and/or developments or modifications thereof), to perform the method according to the above second aspect and/or developments or modifications thereof).

According to further developments or modifications of the present invention, the computer program or computer program product according to the exemplary fifth and/or sixth aspects comprises a computer-readable medium on which the software code portions are stored, and/or the program is directly loadable into a memory of the processor.

By way of exemplary embodiments of the present invention, there are provided mechanisms for improving carrier aggregation, particularly regarding the selection of or operation on a secondary (non-primary) carrier in the framework of carrier aggregation. Such mechanisms according to exemplary embodiments of the present invention may be particularly applicable in the context of LTE/LTE-Advanced networks.

By way of exemplary embodiments of the present invention, there are provided mechanisms for informing a terminal on whether a common physical control of a secondary (non-primary) carrier (via a primary carrier), i.e. of a secondary (non-primary) cell, such as for example broadcast and/or synchronization channels/signals, should be used or not (e.g. due to interference), and for enabling the terminal to select or operate on a secondary (non-primary) carrier even if the common physical control thereof should not be used. To this end, there are provided mechanisms for enabling the terminal to directly monitor a common reference signal of this secondary (non-primary) carrier on the basis of an alignment with the primary carrier, for the purpose of synchronization, RRM-related measurements, demodulation of shared data channels, and RLF (radio link failure) recovery.

By way of exemplary embodiments of the present invention, a terminal is not forced to rely on a common physical control of a secondary (non-primary) carrier, i.e. of a secondary (non-primary) cell, such as for example broadcast and/or synchronization channels/signals, e.g. in the case of interference, and is capable of obtaining required information for selecting or operating on a secondary (non-primary) carrier directly via the primary carrier/cell, and is capable of obtaining synchronization on a secondary (non-primary) carrier directly by monitoring a common reference signal of this secondary (non-primary) carrier on the basis of an alignment with the primary carrier.

Accordingly, procedures of RRM relevant measurements, secondary carrier selection or operation, and (re-)access after Radio Link Failure (RLF) can be conducted on the basis of synchronization without common control of a secondary/non-primary) carrier.

By way of exemplary embodiments of the present invention, an efficient interference management in the framework of carrier aggregation may be enabled.

BRIEF DESCRIPTION OF THE DRAWINGS

In the following, the present invention will be described in greater detail by way of non-limiting examples with reference to the accompanying drawings, in which.

DETAILED DESCRIPTION OF EMBODIMENTS

Figure 1:
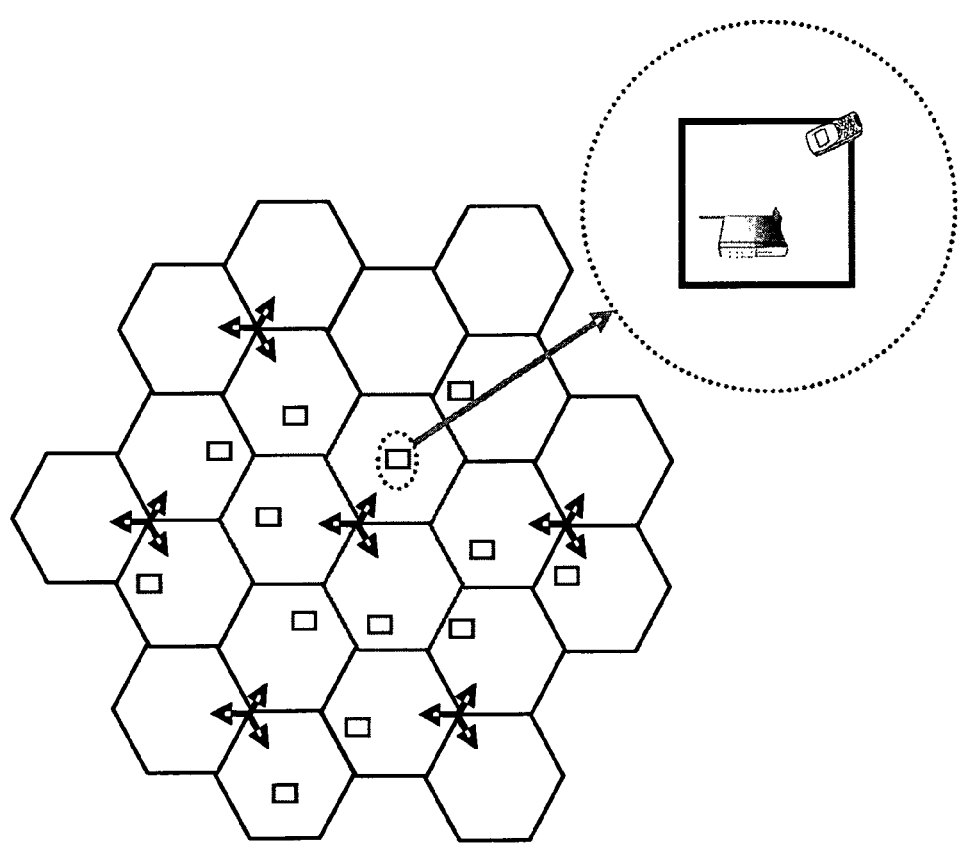
FIG. 1 shows an exemplary illustration of a deployment scenario of a heterogeneous network environment comprising a combination of macrocells and microcells.

The present invention is described herein with reference to particular non-limiting examples and to what are presently considered to be conceivable embodiments of the present invention. A person skilled in the art will appreciate that the invention is by no means limited to these examples, and may be more broadly applied.

Generally, the present invention and its embodiments relate to multi-layer cellular systems also referred to as heterogeneous networks. As described above, in this context, multi-layer networks refer to cases with a mixture of macro cells/base stations as well as micro cells/base stations. As an example, multi-layer LTE/LTE-Advanced networks are particularly referred to herein, while the present invention and its embodiments could equally be applied to other cellular standards as well. Macro layer and micro layer may be implemented in the same or different radio access technologies RAT (for example, the macro layer could be implemented in GSM RAT and the micro layer could be implements in LTE RAT). In LTE/LTE-Advanced, embodiments of the present invention are exemplarily applicable to HeNB microcells. In HSPA/UMTS, embodiments of the present invention are exemplarily applicable to pico-/femtocells.

Further, the present invention and its embodiments relate to the framework of carrier aggregation of a primary carrier and one or more secondary (non-primary) carriers. Yet, the present teaching may be equally applied to any carrier selection or operation technique, irrespective of whether or not a carrier to be selected is a primary carrier, a non-primary carrier or any other (component) carrier, especially but not exclusively in the context of LTE/LTE-Advanced networks. In particular, the present teaching may be beneficially applied to the selection of or operation on any carrier subject to (high and/or unpredictable) interference.

In particular, the present invention and its embodiments are mainly described in relation to 3GPP specifications being used as non-limiting examples for certain exemplary network configurations and deployments. In particular, an LTE/LTE-Advanced network environment is used as a non-limiting example for the applicability of thus described exemplary embodiments. Further, a heterogeneous network environment comprising a combination of macrocells being represented by eNB nodes and microcells being represented by HeNB nodes is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment comprising multiple network layers such as e.g. macrocells and microcells, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

In the following, exemplary embodiments of the present invention are described with reference to methods, procedures and functions.

Figure 2:
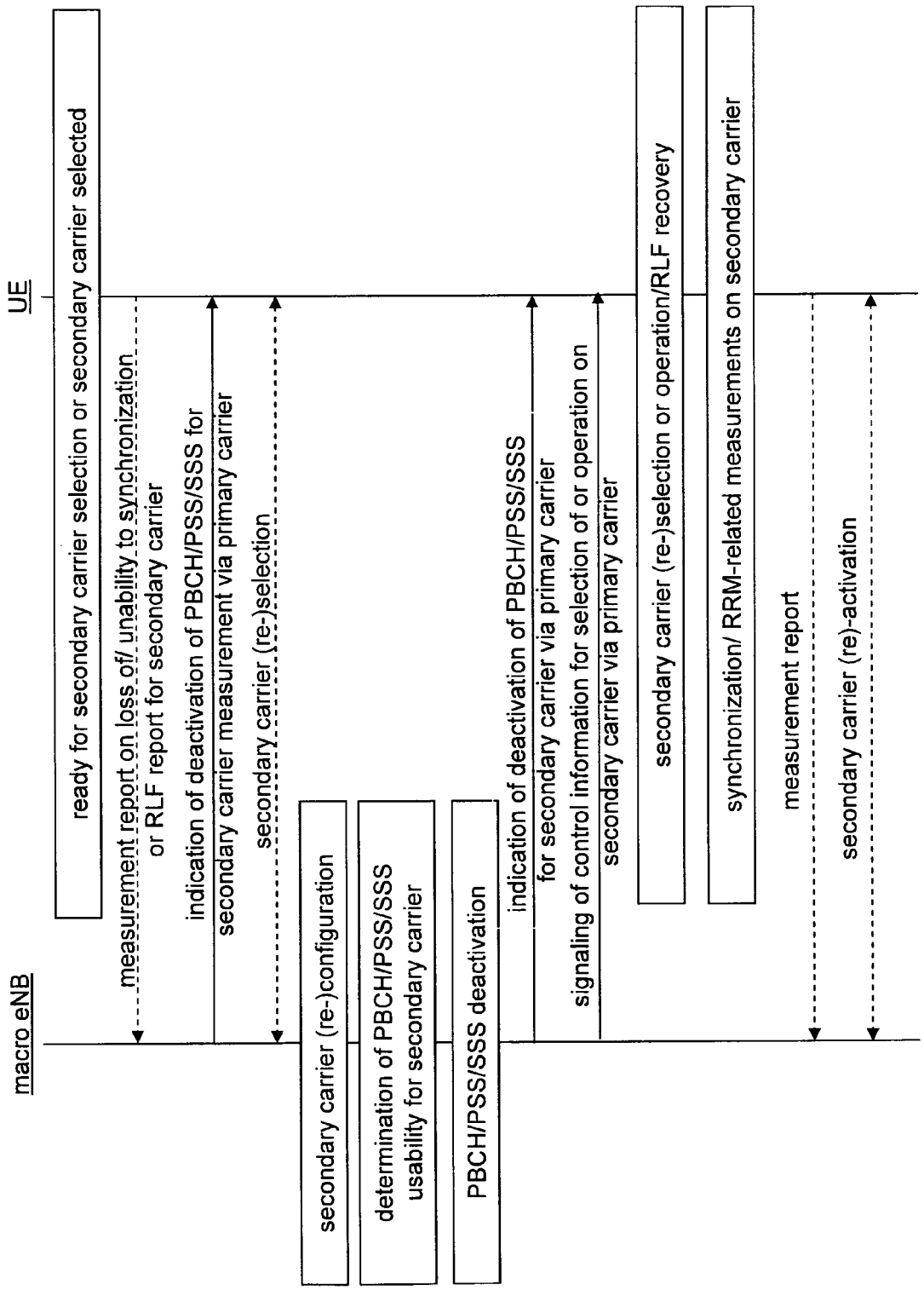
FIG. 2 shows a signaling diagram illustrating an exemplary procedure according to embodiments of the present invention.

FIG. 2 shows a signaling diagram illustrating an exemplary procedure according to embodiments of the present invention. In FIG. 2, optional operations are indicated by use of dashed arrows and blocks.

For the exemplary scenario according to FIG. 2, it is assumed that a non-primary carrier to be selected or operated on is a secondary carrier for carrier aggregation, and it is assumed that a common control of the secondary carrier comprises PBCH and/or PSS and/or SSS as non-limiting examples of the common physical control channels and/or signals. Further, it is assumed that a (macro/micro) base station (e.g. H/eNB) represents a primary cell, i.e. a serving base station (of a primary carrier), and a terminal (UE) residing in the (macro/micro) cell (of this (macro/micro) base station (e.g. H/eNB)) is to select or operate on a secondary carrier.

Generally, a common control deactivation and a corresponding signaling with the exemplary procedure according to FIG. 2 are performed when a (secondary) carrier is configured for carrier aggregation. Such (secondary) carrier configuration may comprise an initial configuration as well as a reconfiguration after loss of synchronization, unability to synchronization, and/or a radio link failure.

Generally, a terminal may firstly conduct normal measurements for all possible carriers, and (together with a serving base station) select or operate on a primary carrier to camp on. Upon such primary carrier selection or operation, the terminal may attach to that primary carrier. Then, a terminal may conduct normal measurements for all possible secondary carriers, and then select or operate on a secondary carrier to camp on.

As a result, as shown in FIG. 2, the terminal may be ready for a secondary carrier selection or operation, or a secondary carrier may even already be selected.

After that, the serving base station may perform secondary carrier configuration as well as the following operations described below.

In connection with a measurement procedure for secondary carrier selection or operation, sometimes a terminal may not get synchronization with the measurement object carrier and, thus, it can not apply measurements for secondary carrier selection or operation. This may be due to heavy interference on common control, e.g. of PSS/SSS/PBCH, which could hamper a normal synchronization procedure, while the common reference signal (CRS) may have better interference conditions for facilitating synchronization. In such case, the serving base station may get to know this condition by some report for the secondary carrier from the terminal (via the primary carrier), as shown in FIG. 2, and may try to indicate to the terminal to ignore/deactivate the common control, e.g. on PBCH/PSS/SSS, for measurements for secondary carrier selection or operation, as shown in FIG. 2. If the measurement results are good enough for secondary carrier selection or operation, then the common control, e.g. on PBCH/PSS/SSS, on this carrier can be deactivated. Thus, according to embodiments of the present invention, the secondary carrier can be selected or operated on with deactivation of common control, e.g. on PBCH/PSS/SSS.

In other cases, after having selected a primary and at least one secondary carrier, a terminal may loose synchronization with the at least one secondary carrier or may detect a radio link failure (RLF) on the at least one secondary carrier e.g. due to interference. Upon such loss of synchronization or RLF for the secondary carrier, the serving base station may get to know this condition by some report for the at least one secondary carrier from the terminal (via the primary carrier), as shown in FIG. 2, and the serving base station may also try to indicate to the terminal to ignore/deactivate the common control, e.g. on PBCH/PSS/SSS, on the previous secondary carrier for measurements for secondary carrier re-selection or operation, as shown in FIG. 2. If the measurement results are good enough for secondary carrier re-selection or operation/RLF recovery, then the common control, e.g. on PBCH/PSS/SSS, on this carrier can be deactivated. Thus, according to embodiments of the present invention, the secondary carrier can be re-selected or operated on with deactivation of common control, e.g. on PBCH/PSS/SSS.

As an alternative to the above-described procedure in which measurements on a certain secondary carrier are tried and another secondary carrier is selected or operated on in case of bad measurement results, there may also be conceivable a procedure in which deactivation of common control is directly effected and a corresponding secondary carrier is selected or operated on and the secondary carrier is changed in case of a bad feedback in using this secondary carrier.

In view of the above, embodiment of the present invention may comprise a signaling from the serving base station to the terminal before the secondary carrier (re-) configuration on ignoring/deactivating the common control for measurements in this regard. Thereby, it may be ensured that, to select or operate on a suitable secondary carrier, reasonable measurement results are obtained firstly, upon which the secondary carrier (re-)selection or operation may be properly based. According to embodiments of the present invention, such proper measurements may be accomplished by ignoring/deactivating the common control, when need be e.g. due to high interference on the common control for the secondary carrier in question.

After that, the base station can perform secondary carrier (re-)configuration as well as the following operations described below.

Accordingly, embodiments of the present invention are effective both in response to a secondary carrier selection or operation and in response to a loss/unability of synchronization or RLF for a secondary carrier.

When (re-)configuring the secondary carrier, the serving base station may determine whether or not a common control, i.e. common physical control channels and/or signals such as PBCH, SSS and/or PSS, is usable for the secondary carrier. Such determination may be based on interference conditions of the common physical control channels and/or signals such as PBCH, SSS and/or PSS, or a previous experiment with a terminal measurement. And such determination may be informed to the terminal by an indication in a relevant (re-)configuration signaling.

When determined to be usable, the procedure may proceed in a conventional manner (not shown). That is, the terminal may select or operate on the secondary carrier using the common physical control channels and/or signals such as PBCH, SSS and/or PSS. That is to say, the terminal may use the common physical control channels and/or signals such as PBCH, SSS and/or PSS for synchronization to the secondary carrier, which enables performing synchronization/RRM-related measurements/potential RLF recovery on this secondary carrier.

When determined to be not usable, the terminal may not rely on the common physical control channels and/or signals such as PBCH, SSS and/or PSS for selecting or operating on the secondary carrier. That is to say, according to embodiments of the present invention, the terminal does not use the common physical control channels and/or signals such as PBCH, SSS and/or PSS, but achieves synchronization to the secondary carrier and performs RRM-related measurements and/or potential RLF recovery on this secondary carrier via the primary carrier, i.e. without using common physical control channels and/or signals such as PBCH, SSS and/or PSS.

In such case, the procedure may proceed according to embodiments of the present invention as follows.

The serving base station may deactivate the common control of the secondary carrier by deactivating the common physical control channels and/or signals such as PBCH, SSS and/or PSS. Such deactivation may then be indicated from the serving base station to the terminal via the primary carrier. That is, the serving base station may indicate to the terminal to ignore/deactivate the common physical control channels and/or signals such as PBCH, SSS and/or PSS e.g. for secondary carrier selection or operation as well as the associated synchronization and RRM-related measurements and/or potential RLF recovery.

Upon such deactivation and indication thereof, the serving base station may signal control information for facilitating selection of or operation on the secondary carrier via the primary carrier to the terminal. Such control information essentially substitute control information of the deactivated common control, thus facilitating selection of or operation on the secondary carrier without the deactivated common control. Such control information may e.g. be information serving for the purpose of synchronization and RRM-related measurements with the secondary carrier, such as for example cell-ID and number of antenna ports (antenna configuration in general), and certain CRS-relevant parameters. The serving base station may signal such control information when it configures RRM measurements (signaling on primary carrier) to ensure that a high interference on the common control channel of a (secondary) carrier does not block the terminal from accessing it.

By virtue of the signaling of such control information from the serving base station to the terminal, the terminal is enabled to select or operate on the secondary carrier without using the common physical control channels and/or signals such as PBCH, SSS and/or PSS. That is, the terminal is enabled to select or operate on the secondary carrier via the primary cell or carrier. According to embodiments of the present invention, this may include direct access to and/or monitoring of a common reference signal (CRS) of the secondary cell or carrier, as well as direct performing RRM-related measurements on the secondary cell or carrier, demodulation of shared data channels, and RLF (radio link failure) recovery.

According to embodiments of the present invention, monitoring of the CRS of the secondary carrier provides for synchronization with the secondary carrier, on the basis of an alignment with the primary carrier. On the basis of such synchronization, RRM-related measurements and/or demodulation of a shared data channel (such as e.g. PDSCH (Physical Downlink Shared Channel) and/or PUSCH (Physical Uplink Shared Channel)) is enabled.

Accordingly, embodiments of the present invention provide for the advantage that the measurement basis for secondary carrier selection or operation may not require the premise of synchronization via PSS/SSS tracing and/or PBCH decoding, especially in case of CRS and data channel getting a better SINR (signal-to-interference-plus-noise ratio) than the common physical control channels and/or signals such as PBCH, SSS and/or PSS, where the carrier is still possible be utilized if not considering the control channel, e.g. with cross scheduling, or time domain partitioning.

Upon receipt of the indication of common control deactivation and the signaling of the control information, the terminal may perform secondary carrier (re-)selection or operation as outlined above, namely by ignoring/deactivating e.g. the PBCH, SSS and/or PSS but by using the primary carrier or cell (e.g. the CRS thereof).

For example, the terminal may tune based on CRS monitoring, may derive synchronization with the secondary carrier by alignment with the primary carrier synchronization, and may obtain required information for the secondary carrier via the primary carrier. According to embodiments of the present invention, the synchronization may for example be derived by monitoring the serving (macro) base station's CRS. This is beneficial as the interference situation for the CRS is assumed to be typically better than that of the PBCH, since the CRS supports frequency shift for mapping of resource elements (RE) or subcarriers.

The terminal may then signal measurement reports to the serving base station, and the serving base station (together with the terminal) may activate the one or more selected or operated secondary carriers for the terminal on the basis of the measurement results.

As a result, the terminal's synchronization on the thus selected or operated and activated secondary carrier will not rely on PSS/SSS detection and PBCH decoding or the like, but it will instead align with primary carrier synchronization on the basis of tuning on the CRS of the secondary carrier.

According to embodiments of the present invention, the indication of common control deactivation and the signaling of control information may be effected by means of different ways or messages (such as exemplarily illustrated in FIG. 2) or by means of the same or similar ways or messages.

According to embodiments of the present invention, the common control deactivation may be terminal-specific (such as exemplarily assumed in FIG. 2) or cell-specific. In case of a terminal-specific common control deactivation which is applicable for a single terminal, the indication thereof (and possibly also the signaling of control information) may be transmitted by an implicit coding or by an explicit indicator or signaling (e.g. a specific message or part/IE (information element) thereof). An implicit coding could e.g. be applied with any existing signaling, such as e.g. RRC (re-) configuration, when configuring secondary carriers. An explicit indicator or signaling could e.g. be implemented by new bit/s or a modification on any existing signaling, such as e.g. RRC (re-) configuration, and/or a new activation and/or deactivation MAC (Medium Access Control) element. One example in this regard could be that a new bit in sCellToAddModlist (or other possible information element) can be added for determination of common control usability of this secondary carrier; and information from PBCH/PSS/SSS, especially on physical cell ID, antenna configuration and MIB can also be carried on new bits within this same information element. To indicate ignoring/deactivating common control on measurement process for secondary carrier selection or operation, a new information element may be added to the measurement object, e.g. new bits for determination usability of common control channel, and/or offset and cell physical ID for CRS monitoring. In case of a cell-specific common control deactivation which is applicable to at least some or all terminals within a secondary cell, the indication thereof (and possibly also the signaling of control information) may be transmitted on a broadcast channel of the primary carrier, such as the PBCH.

According to embodiments of the present invention, in case of a cell-specific common control deactivation, the secondary carrier transmitted by the serving base station may be one specific type, which may be similar to a normal carrier, only with the PBCH and PSS/SSS transmission being disabled as blanked or being used as normal PDSCH.

According to embodiments of the present invention, upon common control deactivation, the serving base station may continue transmitting the (logically) deactivated common physical control channels and/or signals, or may disable the transmission thereof.

According to embodiments of the present invention, upon indication of common control deactivation, the terminal may continue receiving the (logically) deactivated common physical control channels and/or signals and ignore/deactivate them (in case the serving base station continues transmission thereof), or may disable receipt thereof.

Figure 3:
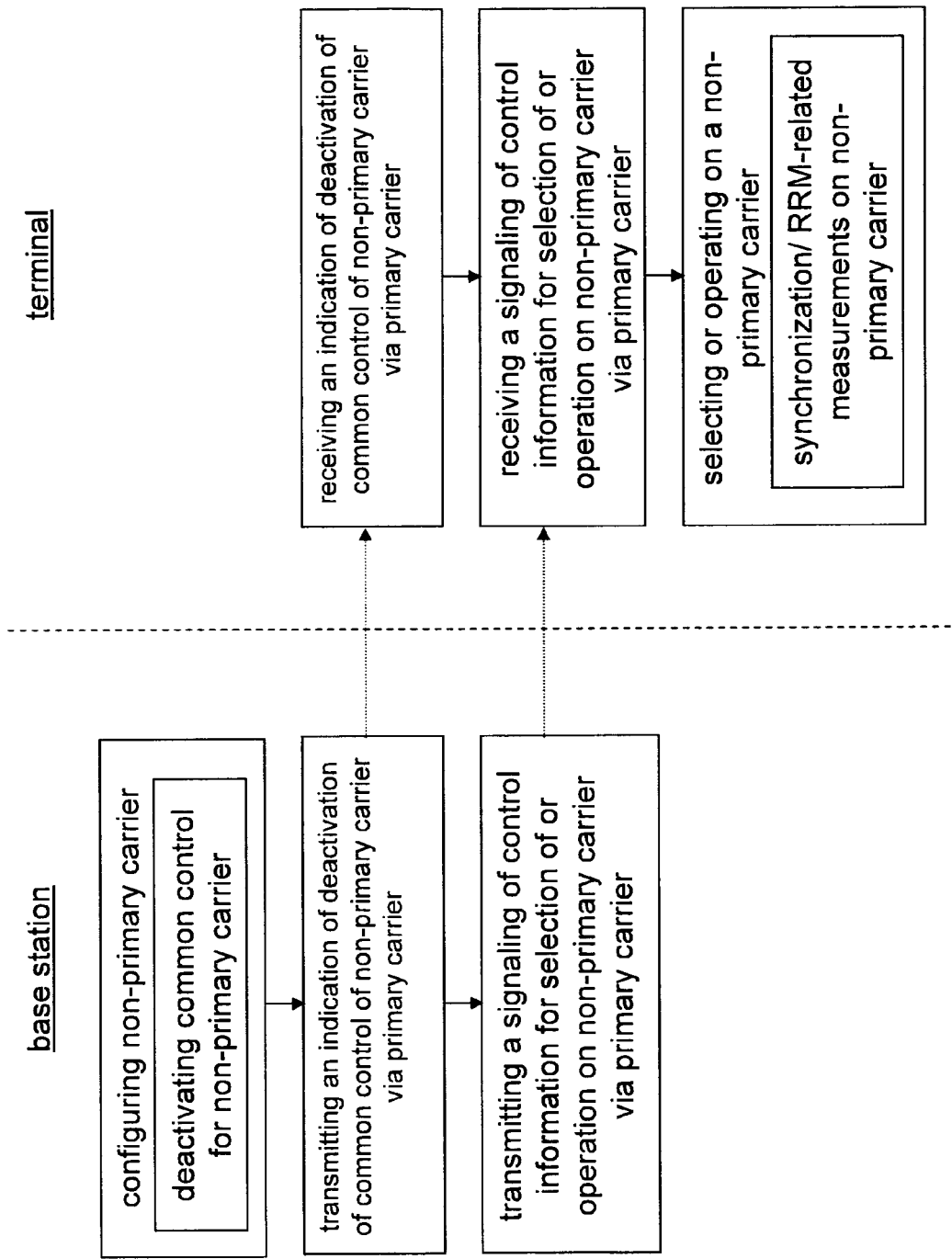
FIG. 3 shows a flowchart illustrating exemplary procedures according to embodiments of the present invention.

FIG. 3 shows a flowchart illustrating exemplary procedures according to embodiments of the present invention.

In FIG. 3, a procedure according to embodiments of the present invention, which is operable at or by a primary cell, i.e. a base station thereof, is illustrated on the left hand side, while a procedure according to embodiments of the present invention, which is operable at or by a terminal or any device, such as a user equipment or micro base station (such as a HeNB), residing in a non-primary cell, i.e. camping on a non-primary carrier, is illustrated on the right hand side. The base station may for example be the macro/micro eNB according to FIG. 2, and the terminal may for example be the UE according to FIG. 2.

Procedures according to embodiments of the present invention may comprise any procedure relating to the base station (network side), any procedure relating to the terminal (terminal side) and/or any combination of procedures on the network and terminal sides.

Generally, according to embodiments of the present invention, procedures at the network and/or terminal side may be such that the operational sequence according to FIG. 2 may be realized.

According to embodiments of the present invention, a procedure at the network side may be as follows.

In a first operation, when configuring a non-primary carrier for carrier aggregation with a primary carrier of a terminal, the primary cell, i.e. the base station thereof, may deactivate a common control for the non-primary carrier. The deactivation operation may for example comprise a determination of the usability of the common control for a non-primary carrier in question. As explained above, the common control may comprise one or more common physical control channels and/or signals of the non-primary carrier. Further, as explained above, the deactivation of the common control for a certain non-primary carrier may be terminal-specific or cell-specific.

In a second operation, the primary cell, i.e. the base station thereof, may indicate the deactivation of the common control for the non-primary carrier via a primary carrier to the terminal, e.g. by transmitting an indication thereof.

In a third operation, the primary cell, i.e. the base station thereof, may signal control information for selection of or operation on the non-primary carrier via the primary carrier to the terminal, e.g. by transmitting a signaling thereof. As explained above, the control information essentially substitutes control information of the deactivated common control, thus facilitating selection of or operation on the non-primary carrier without the deactivated common control. Such control information may comprise information for accessing and/or monitoring a common reference signal of the non-primary carrier or cell, and/or the control information may for example comprise information for synchronization with the primary carrier and/or a radio resource management related measurements of the non-primary carrier and/or demodulation of a shared data channel of the non-primary carrier.

Although not shown in FIG. 3, the primary cell, i.e. the base station thereof, may also receive a report on loss of or unability of synchronization with the non-primary carrier and/or a radio link failure on the non-primary carrier from the terminal, and effect the configuration and the signaling for the non-primary carrier based thereon. Also, the primary cell, i.e. the base station thereof, may receive a report on measurements regarding the selection of or operation on the non-primary carrier from the terminal, and activate the non-primary carrier based thereon. As shown in FIG. 2 but not shown in FIG. 3, before making a decision on secondary carrier (re-)configuration, the base station may try to indicate to the terminal to ignoring/deactivating the common control on the measured non-primary carrier for non-primary carrier measurements so as to minimize the impact from common control interference and provide more candidate non-primary carriers for (re-) selection or operation.

According to embodiments of the present invention, a procedure at the terminal side may be as follows.

In a first operation, the terminal may be indicated of, i.e. may receive an indication of, a deactivation of a common control for a non-primary carrier via a primary carrier from a base station being in charge of configuring the non-primary carrier for carrier aggregation with a primary carrier. As explained above, the common control may comprise one or more common physical control channels and/or signals of the non-primary carrier. Further, as explained above, the deactivation of the common control for a certain non-primary carrier may be terminal-specific or cell-specific.

In a second operation, the terminal may be signaled, i.e. may receive a signaling of the control information for selection of or operation on the non-primary carrier via the primary carrier from the base station. As explained above, this control information essentially substitutes control information of the deactivated common control, thus facilitating selection of or operation on the non-primary carrier without the deactivated common control.

In a third operation, the terminal may select or operate on the non-primary carrier based on the received control information. As explained above, the non-primary carrier selection or operation may for example comprise accessing and/or monitoring a common reference signal of the non-primary carrier or cell, and the non-primary carrier selection or operation may for example comprise synchronization with the non-primary carrier and/or a radio resource management related measurement on the non-primary carrier and/or demodulation of a shared data channel of the non-primary carrier.

Although not shown in FIG. 3, the terminal may also transmit a report on loss of or unability of synchronization with the non-primary carrier and/or a radio link failure on the non-primary carrier to the base station. Also, the terminal may perform measurements regarding the selection of or operation on the non-primary carrier, and transmit a report on the measurements and/or a report on the selection of or operation on the secondary carrier to the base station. As shown in FIG. 2 but not shown in FIG. 3, before making a decision on secondary carrier (re-)selection or operation, the terminal may receive an indication to ignoring/deactivating the common control on the measured non-primary carrier for non-primary carrier measurements from the base station so as to minimize the impact from common control interference and provide more candidate non-primary carriers for (re-) selection or operation. In case of any indication from the base station on trying measurements with ignoring/deactivating the common control, the terminal will follow the instruction and synchronize with the measured non-primary carrier by alignment with primary carrier and monitoring CRS on this measured non-primary carrier, instead of relying on the common control of this measured non-primary carrier.

In view of the above description of FIGS. 2 and 3, embodiments of the present invention are capable of providing for the following effects and benefits, for example.

Embodiments of the present invention include letting a serving base station of a primary cell to inform a terminal camping on a non-primary carrier whether the common control can be used on a certain (non-primary) carrier. If the common control for the certain (non-primary) carrier cannot be used, the terminal is enabled to derive the synchronization on this carrier by alignment with primary carrier synchronization and tuning based on CRS monitoring, and to obtain required system information via the primary carrier. Accordingly, the terminal does not have to and will not rely on the (unusable and deactivated) common control on the non-primary carrier. All information relating to such carrier, especially information serving the purpose of synchronization and RRM measurements with the non-primary carrier, such as physical cell id, CRS-relevant parameters, antenna ports configuration, etc., will be signaled from the serving base station to the terminal via the primary carrier. Thereby, embodiments of the present invention utilize the fact that there is no big difference between the synchronizations of the primary carrier and the non-primary carrier.

According to embodiments of the present invention, the deactivation of the common control (e.g. BCH/SSS/PSS) will not impact a threshold (e.g. Qout) of radio link failure. Rather, embodiments of the present invention are capable of overcoming the problem that, after a RLF, if a normal procedure for re-synchronization would follow, the terminal may hardly successfully finish a re-synchronization procedure, since interference on common control (e.g. BCH/SSS/PSS) is heavy. According to embodiments of the present invention, specifically with a CRS monitoring procedure, it is possible to successfully finish the re-synchronization procedure. A reason for this is that the interference condition of the common control (e.g. BCH/PSS/SSS) may typically be much worse than that of the CRS (of the primary cell). Hence, the terminal cannot follow a normal radio link establish procedure to synchronize with PSS/SSS, but may utilize the CRS for this purpose. That is, similar as for the secondary carrier selection or operation procedure, the terminal may perform measurements directly with the CRS on this carrier, and if the carrier be activated again, the terminal will be synchronized by CRS monitoring to this carrier. Then, reconfiguration on the basis of a RLF report may be executed in this case.

Accordingly, embodiments of the present invention provide for the ability of recovering from a radio link failure even when a common control of a secondary carrier may not be used e.g. due to interference.

A benefit according to embodiments of the present invention is that (e.g. LTE/LTE-Advanced) carriers can be operated in interference hostile environments in an opportunistic way, not risking that a terminal reports radio link failure because poor quality on non-essential common control channels. This may be especially useful when a macro base station coexists with CSG (closed subscriber group) micro base station deployments, e.g. CSG HeNB deployments, on the same carrier, or if (e.g. LTE/LTE-Advanced) carriers are deployed in unlicensed bands (such as the ISM (industrial scientific medical) band) or white space spectrum.

The above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 4, while for the sake of brevity reference is made to the detailed description of respective corresponding methods and operations according to FIGS. 2 and 3 above.

Figure 4:
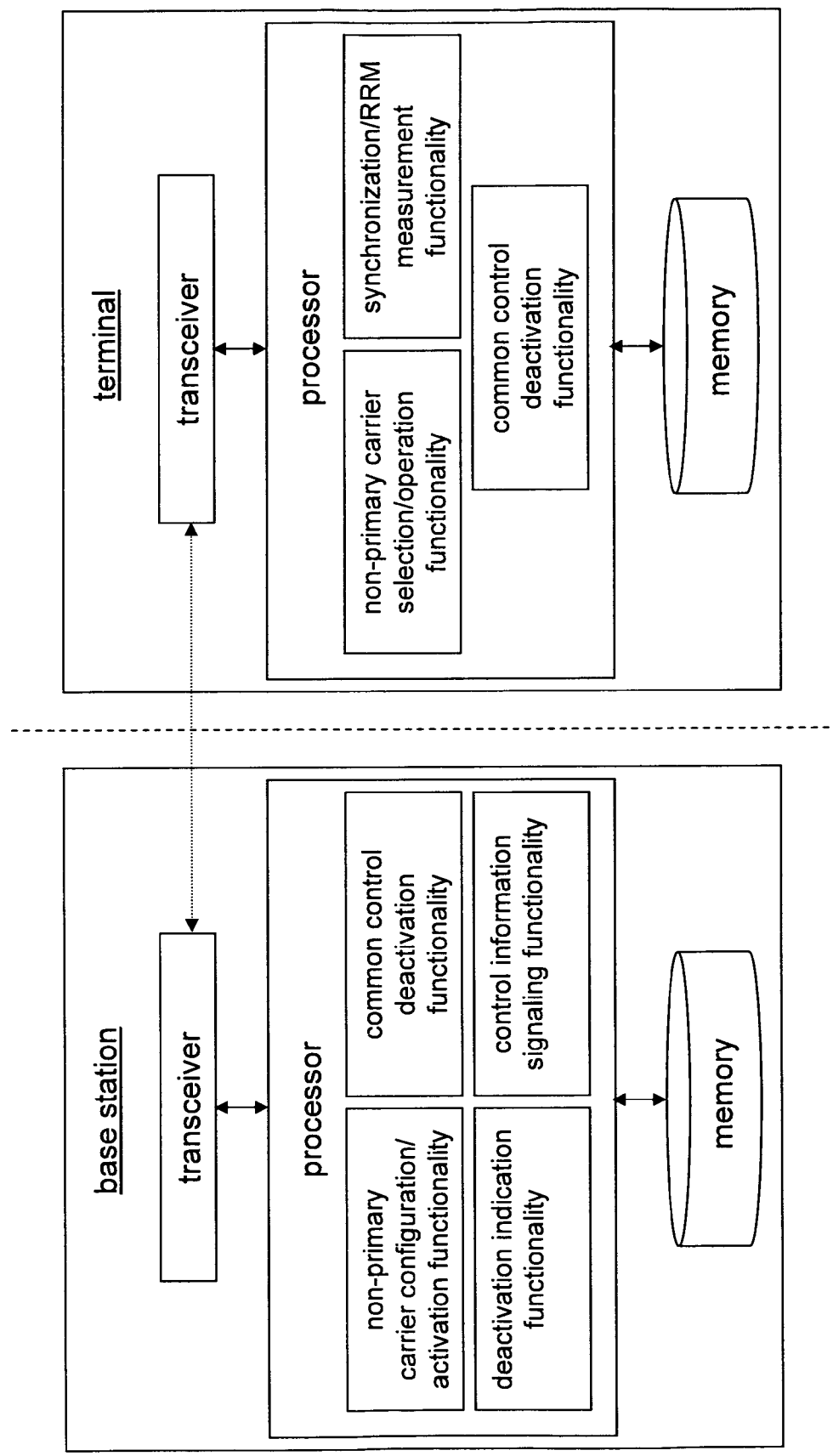
FIG. 4 shows a block diagram illustrating exemplary devices according to embodiments of the present invention.

In FIG. 4 below, the solid line blocks are basically configured to perform respective operations as described above. The entirety of solid line blocks are basically configured to perform the methods and operations as described above, respectively. With respect to FIG. 4, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 4, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 4 shows a block diagram illustrating exemplary devices according to embodiments of the present invention. In view of the above, the thus described apparatus on the left hand side may represent a (part of a) base station of a primary cell such as a macro/micro eNB, as described above, and the thus described apparatus on the right hand side may represent a (part of a) terminal, a user equipment or a micro base station such as a HeNB residing in a non-primary cell, i.e. camping on a non-primary carrier, as described above.

According to FIG. 4, the left-handed apparatus according to exemplary embodiments of the present invention is configured to perform a procedure as described in conjunction with the left hand side of any one of FIGS. 2 and 3, and the right-handed apparatus according to exemplary embodiments of the present invention is configured to perform a procedure as described in conjunction with the right hand side of any one of FIGS. 2 and 3. Therefore, while basic operations are described hereinafter, reference is made to the above description for details thereof.

According to exemplary embodiments illustrated by FIG. 4, a thus depicted apparatus related to a serving base station, i.e. a base station of a primary cell, comprises a processor and a transceiver as well as, optionally, a memory.

The processor may be specifically configured to configure a secondary (non-primary) carrier for carrier aggregation with a primary carrier of a terminal, thus representing means for configuring a secondary (non-primary) carrier. In other words, the processor may have a corresponding secondary (non-primary) carrier configuration functionality. Particularly, the processor may be specifically configured to deactivate a common control for the secondary (non-primary) carrier, thus representing means for deactivating a common control for a certain carrier. In other words, the processor may have a corresponding common control deactivation functionality.

The processor, i.e. at least one of the aforementioned secondary (non-primary) carrier configuration functionality and the aforementioned common control deactivation functionality, may be specifically configured to determine the usability of the common control for a certain carrier.

The processor may also be specifically configured to generate an indication of the deactivation of the common control for the secondary (non-primary) carrier via the primary carrier, thus representing means for generating an indication of common control deactivation. In other words, the processor may have a corresponding deactivation indication functionality. As exemplarily shown in FIG. 2, such indication may be an indication on the secondary carrier (re-)selection procedure when a secondary carrier is already selected but is to be re-selected as well as an indication on the measurement configuration when a secondary carrier is not selected yet or an indication on the secondary carrier (re-) configuration when after measurement the secondary carrier is selected with determination of common control un-usability. Further, the processor may also be specifically configured to generate a signaling of control information, substituting control information of the deactivated common control, for facilitating selection of or operation on the secondary (non-primary) carrier without the deactivated common control via the primary carrier, thus representing means for generating a signaling of control information. In other words, the processor may have a corresponding control information signaling functionality.

The aforementioned corresponding deactivation indication and control information signaling functionalities of the processor may be operative to cause/instruct the transceiver to transmit the generated indication and signaling to the terminal, respectively.

The transceiver, i.e. a transmitter part thereof, may be specifically configured to transmit the indication of the deactivation of the common control for the secondary (non-primary) carrier and/or the signaling of control information for selection of or operation on the secondary (non-primary) carrier, as generated by the processor, to the terminal. Thus, the transceiver may represent means for transmitting an indication of common control deactivation and/or a signaling of control information to the terminal.

In this regard, any specifics regarding the common control, the deactivation thereof, and the control information are exemplarily as described above in connection with FIG. 2 and/or 3.

For example, the processor may be specifically configured to generate and/or instruct transmission of the indication of common control deactivation and/or the signaling of control information by an implicit coding or by an explicit indicator or signaling, and/or the processor may be specifically configured to generate and/or instruct transmission of the indication of common control deactivation and/or the signaling of control information on a broadcast channel of the primary carrier.

For example, the transceiver, i.e. a receiver part thereof, may be specifically configured to receive a report on loss/unability of synchronization with the secondary (non-primary) carrier and/or a radio link failure on the secondary (non-primary) carrier from the terminal, thus representing means for receiving such report. Then, the processor (in particular, its aforementioned functionalities) and/or the transmitter may be specifically configured to effect the configuration and/or the signaling for the secondary carrier based thereon.

For example, the transceiver, i.e. a receiver part thereof, may be specifically configured to receive a report on measurements regarding the selection of or operation on the secondary (non-primary) carrier from the terminal, thus representing means for receiving such report. Then, the processor (in particular, its aforementioned functionalities) may be specifically configured to activate the secondary carrier based thereon. In other words, the processor may have a corresponding secondary (non-primary) carrier activation functionality.

According to exemplary embodiments illustrated by FIG. 4, the thus depicted base station may further comprise a memory. This memory may for example store any data required for and/or resulting from the above-described functionalities. For example, the memory may store information required for determining the usability of a common control on a certain carrier, (the basis for generating) the control information, information required for generating the indication and/or the signaling, and so forth.

According to exemplary embodiments illustrated by FIG. 4, a thus depicted apparatus related to a terminal, i.e. a terminal of a secondary (non-primary) cell, comprises a processor and a transceiver as well as, optionally, a memory.

The transceiver, i.e. a receiver part thereof, may be specifically configured to receive an indication of a deactivation of a common control for a secondary (non-primary) carrier and/or a signaling of control information for selection of or operation on a secondary (non-primary) carrier via a primary carrier from a base station. As exemplarily shown in FIG. 2, such indication may be an indication on the (re-) selection procedure when a secondary carrier is already selected but is to be re-selected as well as an indication on the measurement configuration when a secondary carrier is not selected yet or an indication on the secondary carrier (re-) configuration when after measurement the secondary carrier is selected with determination of common control unusability. The control information are for substituting control information of the deactivated common control so as to facilitate selection of or operation on the secondary (non-primary) carrier without the deactivated common control via the primary carrier. Thus, the transceiver may represent means for receiving an indication of common control deactivation and/or a signaling of control information to the terminal.

The processor may be specifically configured to select or operate on the secondary (non-primary) carrier based on the received control information, thus representing means for selecting or operating on a secondary (non-primary) carrier. In other word, the processor may have a corresponding secondary (non-primary) carrier selection/operation functionality.

The processor may be specifically configured to deactivate the common control at the side of the terminal, i.e. to (actively) the common control, based on the received indication from the base station, thus representing means for deactivating/ignoring a common control of the secondary (non-primary) carrier. In other word, the processor may have a corresponding common control deactivation functionality.

In this regard, any specifics regarding the common control, the deactivation thereof, the control information, and the selection of or operation on the secondary (non-primary) carrier are exemplarily as described above in connection with FIG. 2 and/or 3.

For example, the processor may be specifically configured to access and/or monitor the common reference signal of the primary carrier, and/or to synchronize with the secondary carrier by aligning with the primary carrier synchronization and/or perform measurements relating to the radio resource management of the secondary carrier and/or demodulate the shared data channel of the secondary carrier and/or perform radio link failure recovery of the secondary carrier. In other words, the processor may have a corresponding synchronization/RRM measurement functionality.

For example, the transceiver, i.e. the receiver part thereof, may be specifically configured to receive transmission of the indication of common control deactivation and/or the signaling of control information by an implicit coding or by an explicit indicator or signaling, and/or the transceiver, i.e. the receiver part thereof, may be specifically configured to receive transmission of the indication of common control deactivation and/or the signaling of control information on a broadcast channel of the primary carrier.

For example, the processor may be specifically configured to detect a loss/unability of synchronization with the secondary (non-primary) carrier and/or a radio link failure on the secondary (non-primary) carrier to the base station, and to generate a report thereon. Then, the transceiver, i.e. a transmitter part thereof, may be specifically configured to transmit the report on loss/unability of synchronization with the secondary (non-primary) carrier and/or a radio link failure on the secondary (non-primary) carrier to the base station.

For example, the processor may be specifically configured to perform measurements regarding the selection of or operation on the secondary (non-primary) carrier, and to generate a report thereon. Then the transceiver, i.e. a transmitter part thereof, may be specifically configured to transmit a report on measurements regarding the selection of or operation on the secondary (non-primary) carrier and/or the selection of or operation on the secondary (non-primary) carrier to the base station.

For example, the processor may be specifically configured to select or operate on a primary carrier, and the transceiver, i.e. a transmitter part thereof, may be specifically configured to transmit a report on the primary carrier selection to the base station.

According to exemplary embodiments illustrated by FIG. 4, the thus depicted terminal may further comprise a memory. This memory may for example store any data required for and/or resulting from the above-described functionalities. For example, the memory may store information required for primary and/or secondary (non-primary) carrier selection or operation, synchronization, channel demodulation, and so forth.

According to exemplarily embodiments of the present invention, a system may comprise any conceivable combination of the thus depicted apparatuses (such as one or more terminals and associated one or more network entities such as base stations or home base stations)

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

Generally, for the purpose of the present invention as described herein above, it should be noted that method steps and functions likely to be implemented as software code portions and being run using a processor at one of the entities, a network element, or a terminal (as examples of devices, apparatuses and/or modules thereof, or as examples of entities including apparatuses and/or modules therefor), are software code independent and can be specified using any known or future developed programming language, such as e.g. Java, C++, C, and Assembler, as long as the functionality defined by the method steps is preserved;

generally, any method step is suitable to be implemented as software or by hardware without changing the idea of the invention in terms of the functionality implemented;

method steps, functions, and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for common control deactivation in carrier aggregation, said measures exemplarily comprising a configuration of a secondary carrier for carrier aggregation with a primary carrier of a terminal, including a deactivation of a common control for the secondary carrier, an indication of the deactivation of the common control for the secondary carrier via the primary carrier, and a signaling of control information, substituting control information of the deactivated common control, for facilitating selection of or operation on the secondary carrier without the deactivated common control via the primary carrier from a base station to the terminal. Said measures may exemplarily be applied for common control deactivation in carrier aggregation in heterogeneous network environments based on LTE, LTE-Advanced, HSPA and/or UMTS radio access systems.

The present invention and/or exemplary embodiments thereof are attractive from a network implementation point of view, especially for specifications such as e.g. 3GPP LTE Rel-9/10 standards and beyond, e.g. as compared with current specifications such as e.g. current 3GPP LTE Rel-8 standards.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

The invention claimed is:

1. A method comprising:
   configuring, by a network entity, a secondary carrier for carrier aggregation with a primary carrier of a terminal, including deactivating a physical common channel for the secondary carrier;
   transmitting, by the network entity, an indication of the deactivation of the physical common channel for the secondary carrier via the primary carrier to the terminal; and
   transmitting, by the network entity, a signaling of control information that is substituting other control information of the deactivated physical common channel, the control information facilitating selection of the secondary carrier and enabling the terminal to access and monitor a common reference signal of the secondary carrier without the deactivated physical common channel via the primary carrier to the terminal, wherein the control information comprises information for at least two of synchronization with the secondary carrier, radio resource management related measurements on the secondary carrier, demodulation of a shared data channel of the secondary carrier, and radio link failure recovery of the secondary carrier.

2. The method according to claim 1, wherein the deactivation of the physical common channel comprises
   deactivating at least one of a physical broadcast channel, a primary signaling signal and a secondary signaling signal, wherein at least one of
   the deactivated physical broadcast channel, primary signaling signal and secondary signaling signal is continued to be transmitted or disabled to be transmitted.

3. The method according to claim 1, wherein the indication of the deactivation comprises at least one of
   an indication on secondary carrier selection,
   re-selection procedure when a secondary carrier is already selected,
   an indication on secondary carrier measurement configuration when a secondary carrier is not selected, and
   an indication on secondary carrier configuration and/or re-configuration when after measurement the secondary carrier is selected with determination of common control un-usability.

4. The method according to claim 1, wherein the indication of the deactivation comprises at least one of
   a terminal-specific deactivation being applicable for the said terminal, the indication of which is transmitted by an implicit coding or by an explicit indicator, and
   a cell-specific deactivation being applicable for some or all terminals using the primary carrier, the indication of which is transmitted on a broadcast channel of the primary carrier.

5. The method according to claim 1, further comprising at least one of
   receiving a report on a loss and inability of synchronization with the secondary carrier and a radio link failure on the secondary carrier from the terminal, wherein the report is effecting at least one of the configuration and the signaling for the secondary carrier based thereon; and
   receiving a report on measurements regarding the selection of the secondary carrier from the terminal, and activating the secondary carrier based thereon.

6. A method comprising:
   receiving, by a terminal device, an indication of a deactivation of a physical common channel control for a secondary carrier via a primary carrier from a base station being in charge of configuring the secondary carrier for carrier aggregation with the primary carrier;
   receiving, by the terminal device, a signaling of control information that is substituting other control information of the deactivated physical common channel, the control information facilitating selection of the secondary carrier and enabling the terminal device to access and monitor a common reference signal of the secondary carrier without the deactivated physical common channel via the primary carrier from the base station; and
   selecting or operating on the secondary carrier based on the received control information, wherein the control information comprises information for at least two of synchronization with the secondary carrier, radio resource management related measurements on the secondary carrier, demodulation of a shared data channel of the secondary carrier, and radio link failure recovery of the secondary carrier.

7. The method according to claim 6, wherein the selecting or operating on comprises at least one of accessing and monitoring the common reference signal of the secondary carrier.

8. The method according to claim 6,
wherein the selecting or operating on comprises at least one of synchronizing with the secondary carrier by aligning with the primary carrier synchronization, performing measurements relating to radio resource management of the secondary carrier, demodulating the shared data channel of the secondary carrier, and performing radio link failure recovery of the secondary carrier.

9. The method according to claim 6, wherein the deactivation of the physical common channel comprises
a deactivation of at least one of a physical broadcast channel, a primary signaling signal and a secondary signaling signal, wherein at least one of the deactivated physical broadcast channel, primary signaling signal and secondary signaling signal is received and ignored.

10. The method according to claim 6, wherein the indication of the deactivation comprises at least one of
an indication on secondary carrier selection or re-selection procedure when a secondary carrier is already selected,
an indication on secondary carrier measurement configuration when a secondary carrier is not selected, and
an indication on secondary carrier configuration and/or re-configuration when after measurement the secondary carrier is selected with determination of common control unusability.

11. The method according to claim 6, wherein the indication of the deactivation comprises at least one of
a terminal-specific deactivation, the indication of which is received by an implicit coding or by an explicit indicator, and
a cell-specific deactivation, the indication of which is received on a broadcast channel of the primary carrier.

12. The method according to claim 6, further comprising at least one of
transmitting a report on a loss and inability of synchronization with the secondary carrier and a radio link failure on the secondary carrier to the base station; and
transmitting a report on measurements regarding the selection of the secondary carrier to the base station.

13. An apparatus comprising:
at least one processor; and
at least one memory including computer program code, where the at least one memory and the computer program code are configured, with the at least one processor, to cause the apparatus to at least:
configure a secondary carrier for carrier aggregation with a primary carrier of a terminal, including deactivating a physical common channel for the secondary carrier;
transmit an indication of the deactivation of the physical common channel for the secondary carrier via the primary carrier to the terminal, and transmit a signaling of control information that is substituting other control information of the deactivated physical common channel, the control information facilitating selection of the secondary carrier and enabling the terminal to access and monitor a common reference signal of the secondary carrier without the deactivated physical common channel via the primary carrier to the terminal, wherein the control information comprises information for at least two of synchronization with the secondary carrier, radio resource management related measurements on the secondary carrier, demodulation of a shared data channel of the secondary carrier, and radio link failure recovery of the secondary carrier.

14. An apparatus comprising:
at least one processor; and
at least one memory including computer program code, where the at least one memory and the computer program code are configured, with the at least one processor, to cause the apparatus to at least:
receive an indication of a deactivation of a physical common channel for a secondary carrier via a primary carrier from a base station being in charge of configuring the secondary carrier for carrier aggregation with the primary carrier, and
receive a signaling of control information that is substituting other control information of the deactivated physical common channel, the control information facilitating selection of the secondary carrier and enabling the apparatus to access and monitor a common reference signal of the secondary carrier without the deactivated physical common channel via the primary carrier from the base station, wherein the control information comprises information for at least two of synchronization with the secondary carrier, radio resource management related measurements on the secondary carrier, demodulation of a shared data channel of the secondary carrier, and radio link failure recovery of the secondary carrier; and
select or operate on the secondary carrier based on the received control information.

15. A non-transitory memory comprising computer program code, the computer program code executed by a processor of an apparatus, to cause the apparatus to perform:
configuring a secondary carrier for carrier aggregation with a primary carrier of a terminal, including deactivating a physical common channel for the secondary carrier;
transmitting an indication of the deactivation of the physical common channel for the secondary carrier via the primary carrier to the terminal; and
transmitting a signaling of control information that is substituting control information of the deactivated physical common channel, the control information facilitating selection of the secondary carrier and enabling the terminal to access and monitor a common reference signal of the secondary carrier without the deactivated physical common channel via the primary carrier to the terminal, wherein the control information comprises information for at least two of synchronization with the secondary carrier, radio resource management related measurements on the secondary carrier, demodulation of a shared data channel of the secondary carrier, and radio link failure recovery of the secondary carrier.

16. A non-transitory memory comprising computer program code, the computer program code executed by a processor of an apparatus, to cause the apparatus to perform:
receiving an indication of a deactivation of a physical common channel for a secondary carrier via a primary carrier from a base station being in charge of configuring the secondary carrier for carrier aggregation with the primary carrier;
receiving a signaling of control information that is substituting other control information of the deactivated physical common channel, the control information facilitating selection of the secondary carrier and enabling the apparatus to access and monitor a common reference signal of the secondary carrier without the deactivated physical common channel via the primary carrier from the base station, wherein the control information comprises information for at least two of synchronization with the secondary carrier, radio resource management related measurements on the secondary carrier, demodulation of a shared data channel of the secondary carrier, and radio link failure recovery of the secondary carrier; and selecting or operating on the secondary carrier based on the received control information.

17. The non-transitory memory comprising the computer program code according to claim 16, wherein the selecting or operating on comprises at least one of accessing and monitoring the common reference signal of the secondary carrier.

18. The method according to claim 1, wherein the signaling of the control information is implemented by at least one of added new bit/s or a modification on existing signaling comprising at least one of radio resource control signaling, and medium access control signaling.

* * * * *